(12) United States Patent      (10) Patent No.:    US 8,814,044 B2
Yuan et al.                                                       (45) Date of Patent:     Aug. 26, 2014

(54) INTELLECTUAL MATERIAL OBJECT MANAGEMENT METHOD AND SYSTEM

(75) Inventors: Li Yuan, New Taipei (TW); Tai-Hsin Chou, New Taipei (TW); Qiong-Yu Niu, New Taipei (TW); Tian-Heng Zhao, New Taipei (TW)

(73) Assignee: Wistron Corp., New Taipei (TW)

( * ) Notice: Subject to any disclaimer, the term of this patent is extended or adjusted under 35 U.S.C. 154(b) by 206 days.

(21) Appl. No.: 13/563,744

(22) Filed: Aug. 1, 2012

(65) Prior Publication Data

US 2013/0248597 A1     Sep. 26, 2013

(30) Foreign Application Priority Data

Mar. 23, 2012    (CN) .......................... 2012 1 0080365

(51) Int. Cl.
     *G06F 17/00*         (2006.01)
     *G06F 19/00*         (2011.01)
     *G06Q 30/00*        (2012.01)

(52) U.S. Cl.
     USPC ............. 235/385; 235/375; 705/28; 340/5.92

(58) Field of Classification Search
     CPC ..... G06Q 10/087; G06Q 10/00; G06Q 10/08; G06Q 20/203
     USPC ............... 235/375, 385; 705/28–29; 340/5.92
     See application file for complete search history.

(56) References Cited

U.S. PATENT DOCUMENTS

| 4,673,932 | A  | * | 6/1987 | Ekchian et al. ............. 340/10.32 |
| 6,076,023 | A  | * | 6/2000 | Sato ............................... 700/214 |
| 2004/0193316 | A1 | * | 9/2004 | Lunak et al. ................... 700/243 |
| 2013/0173435 | A1 | * | 7/2013 | Cozad, Jr. ....................... 705/28 |

* cited by examiner

*Primary Examiner* — Michael G Lee
*Assistant Examiner* — Laura Gudorf
(74) *Attorney, Agent, or Firm* — CKC & Partners Co., Ltd.

(57) ABSTRACT

An intellectual material object management method includes: an RF scanning device scans a carrier tag of a replenishment carrier and a shelf tag of at least one present supplying shelf among stock shelves of a warehouse to assist for putting the replenishment carrier on a target shelf for the replenishment carrier. An MO picking list for obtaining information of at least one selected MO is received. The RF scanning device scans an MO tag of a present picking MO on a present picking shelf among the stock shelves and a list tag of the MO picking list to assist for obtaining the selected MO from the stock shelves of the warehouse. A remaining amount of remaining MOs is counted. An amount tag for the remaining MOs is printed according to the remaining amount of the remaining MOs for sticking on a remaining MO carrier for loading the remaining MOs.

10 Claims, 4 Drawing Sheets

INTELLECTUAL MATERIAL OBJECT MANAGEMENT METHOD AND SYSTEM

RELATED APPLICATIONS

This application claims priority to Chinese Application Serial Number 201210080365.0, filed Mar. 23, 2012, which is herein incorporated by reference.

BACKGROUND

1. Technical Field

The present invention relates to an intellectual material object (MO) management method and system, more particularly, to an intellectual MO management method and system utilizing radio frequency (RF) tag scanning.

2. Description of Related Art

In conducting surface mount technology (SMT), material objects (MO) are often picked by manpower. Most warehouses store many MOs with various identification numbers. It is hard for staffs to pick the MOs quickly and/or pick a precise amount of MOs. As a result, the staffs may incorrectly pick the MOs, or even pause entire production line.

Such problems may result from the following reasons:

1. Staffs supply MOs to wrong stock shelves.
2. Staffs are unfamiliar with positions of shelves and MO identification (ID) number, such that staffs can not find wanted MOs easily. As a result, staffs can not pick MOs quickly.
3. Most MO ID numbers are similar, which causes that staffs may wrongly identify such ID number or put onto wrong shelves.
4. Staffs counts and hand-writes amounts of offline MOs on tags of carriers loading the same, which often leads that such tags are hard to be identified due to careless or wrong handwriting.
5. Another group of staffs may be required for checking picked MOs.

Hence, there is a need to provide an intellectual MO management method to overcome such weakness due to manpower.

SUMMARY

According to one embodiment of this invention, an intellectual material object (MO) management method is disclosed to assist MO management by radio frequency (RF) tag scanning. The intellectual MO management method includes the following steps:

(a) a carrier tag of a replenishment carrier and a shelf tag of at least one present supplying shelf are scanned utilizing a RF scanning device to assist for putting the replenishment carrier on a target shelf for the replenishment carrier. Wherein, the present supplying shelf is one of stock shelves of a warehouse.

(b) an MO picking list for obtaining information of at least one selected MO is received.

(c) an MO tag of a present picking MO on a present picking shelf, which is one of the stock shelves, and a list tag of the MO picking list are scanned utilizing the RF scanning device to assist for obtaining the selected MO from the stock shelves of the warehouse.

(d) a remaining amount of remaining MOs is counted utilizing a counting device.

(e) an amount tag for the remaining MOs is printed according to the remaining amount of the remaining MOs for sticking on a remaining MO carrier for loading the remaining MOs.

According to another embodiment of this invention, an intellectual material object management system is provided to assist MO management by RF tag scanning. The intellectual material object management system includes a database, an RF scanning device, a counting device and a printer. The RF scanning device includes a communication unit, an RF scanning unit and a processing unit. The communication unit builds a connection with the database. The processing unit is electrically connected to the communication unit and the RF scanning unit. The processing unit includes a replenishment assisting module, a list receiving module and a picking assisting module. The replenishment assisting module utilizes the RF scanning unit to scan a carrier tag of a replenishment carrier and a shelf tag of at least one present supplying shelf. The replenishment assisting module queries the database according to the scanned carrier tag of the replenishment carrier and the scanned shelf tag of the present supplying shelf to assist for putting the replenishment carrier on a target shelf for the replenishment carrier. Wherein, the present supplying shelf is one of stock shelves of a warehouse. The list receiving module receives an MO picking list for obtaining information of at least one selected MO. The picking assisting module utilizes the RF scanning unit to scan an MO tag of a present picking MO on a present picking shelf, which is one of the stock shelves, and a list tag of the MO picking list. The picking assisting module queries the database according to the scanned MO tag of the present picking MO and the scanned list tag of the MO picking list to assist for obtaining the selected MO from the stock shelves of the warehouse. The counting device counts a remaining amount of remaining MOs. The printer prints an amount tag for the remaining MOs according to the remaining amount of the remaining MOs for sticking on a remaining MO carrier for loading the remaining MOs.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
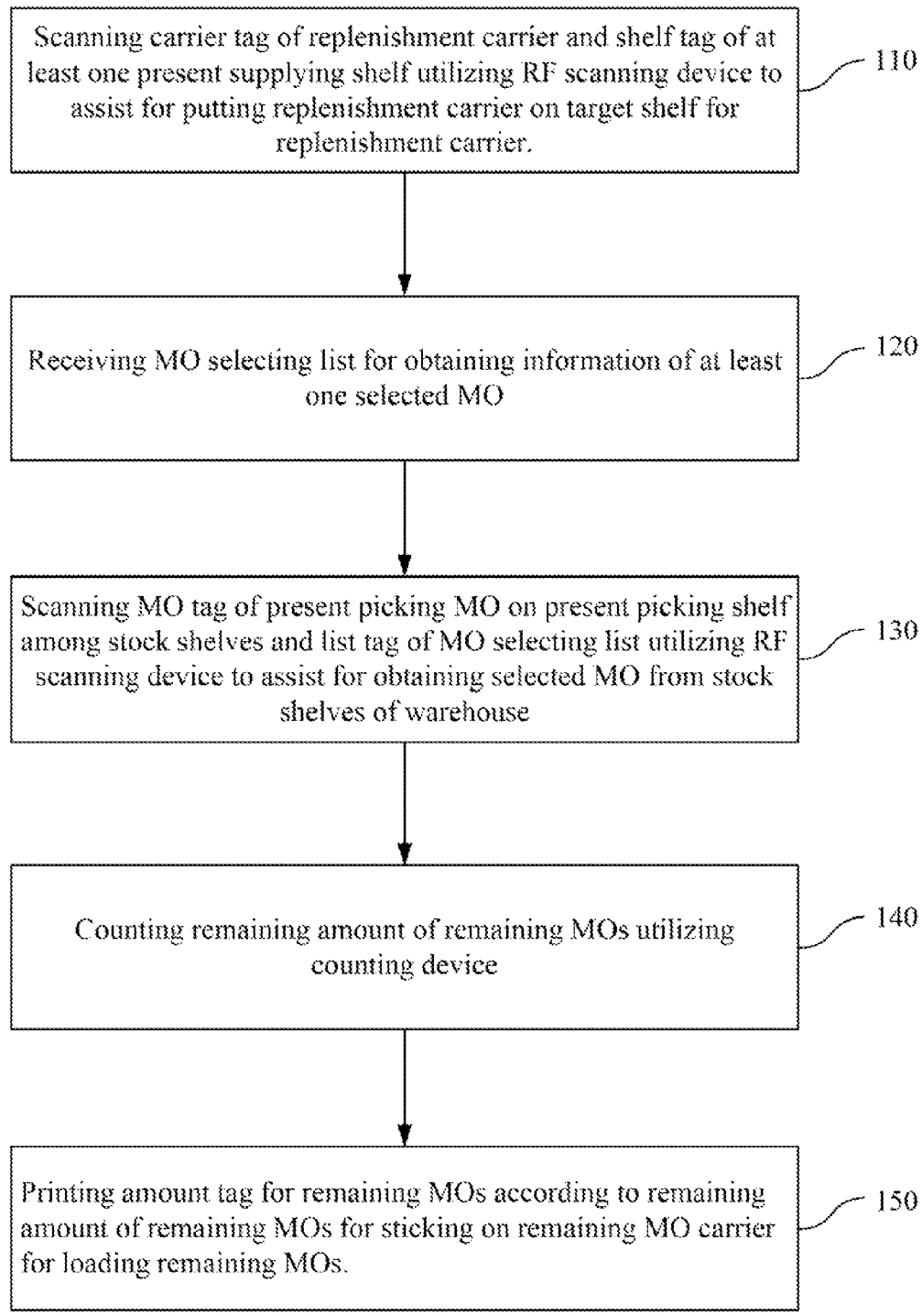
FIG. 1 is a flow diagram of an intellectual MO management method according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates an intellectual MO management method according to one embodiment of this invention. In the intellectual MO management method, RF tag scanning is utilized to assist MO management. The intellectual MO management method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The intellectual material object management method 100 includes the following steps:

At step 110, a carrier tag of a replenishment carrier and a shelf tag of at least one present supplying shelf are scanned utilizing a RF scanning device to assist for putting the replenishment carrier on a target shelf for the replenishment carrier. Wherein, the present supplying shelf is one of stock shelves of a warehouse.

At step 120, an MO picking list for obtaining information of at least one selected MO is received.

At step 130, an MO tag of a present picking MO on a present picking shelf among the stock shelves and a list tag of the MO picking list are scanned utilizing the RF scanning device to assist for obtaining the selected MO from the stock shelves of the warehouse.

At step 140, a remaining amount of remaining MOs is counted utilizing a counting device.

At step 150, an amount tag for the remaining MOs is printed according to the remaining amount of the remaining MOs for sticking on a remaining MO carrier for loading the remaining MOs. Therefore, it can be avoided that the remaining amount is hard to being identified due to careless or wrong handwriting. Furthermore, users can learn to supply or pick MOs easily with RF tag scanning.

Figure 2:
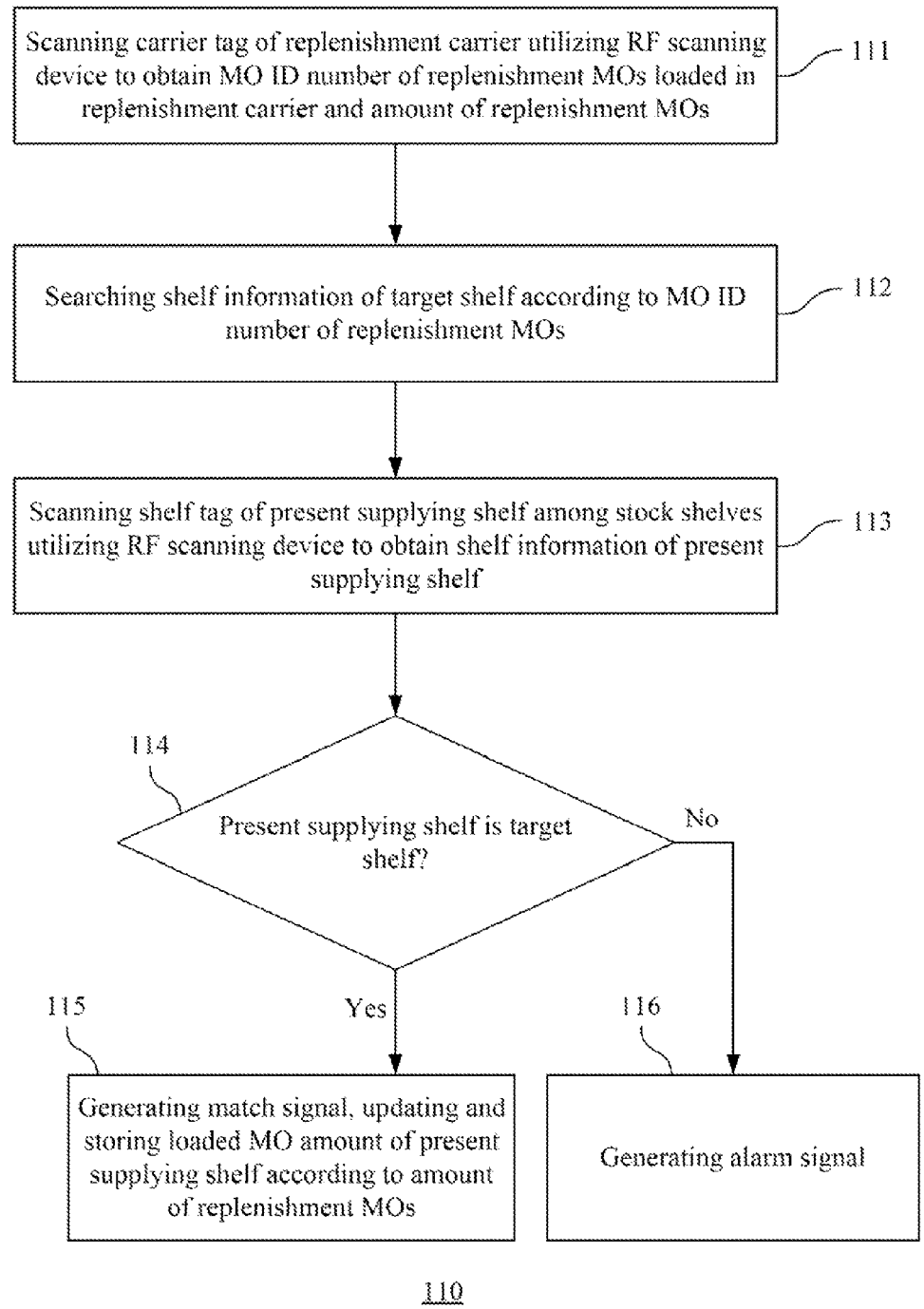
FIG. 2 is a flow diagram of an embodiment of step 110.

Referring to FIG. 2, an embodiment of step 110 will be described. Step 110 may start at operation 111 to scan the carrier tag of the replenishment carrier utilizing the RF scanning device to obtain an MO identification (ID) number of replenishment MOs loaded in the replenishment carrier and an amount of the replenishment MOs. Wherein, the target shelf is one of the stock shelves. In other words, in one scenario of this invention, during MO supplying, users can utilize the RF scanning device to scan the carrier tag of the replenishment carrier for performing operation 111.

Step 110 continues from operation 111 to operation 112, where shelf information of the target shelf is searched according to the MO ID number of the replenishment MOs. In some embodiments, a position notice message to notice position information of the target shelf may be generated. Therefore, users can find the position of the target shelf easily.

Step 110 continues to operation 113 to scan the shelf tag of the present supplying shelf among the stock shelves utilizing the RF scanning device to obtain shelf information of the present supplying shelf. In other words, in one scenario of this invention, when a user arrives a present supplying shelf, he/she can utilize the RF scanning device to scan the shelf tag of the present supplying shelf for performing operation 113.

Subsequently, at operation 114, determine if the present supplying shelf is the target shelf according to the shelf information of the present supplying shelf and the shelf information of the target shelf.

When it is determined that the present supplying shelf is the target shelf, step 110 continues to operation 115 to generate a match signal, update and store a loaded MO amount of the present supplying shelf according to the amount of the replenishment MOs. Hence, when the match signal is received, a user can put the replenishment carrier onto the present supplying shelf. Therefore, the replenishment carrier can be put onto the correct shelf, and the amount of the MO loaded on the present supplying shelf can be updated correctly in time.

When it is determined that the present supplying shelf is not the target shelf, step 110 continues to operation 116 to generate an alarm signal. Hence, when the alarm signal is received, a user may not put the replenishment carrier onto the wrong shelf.

Figure 3:
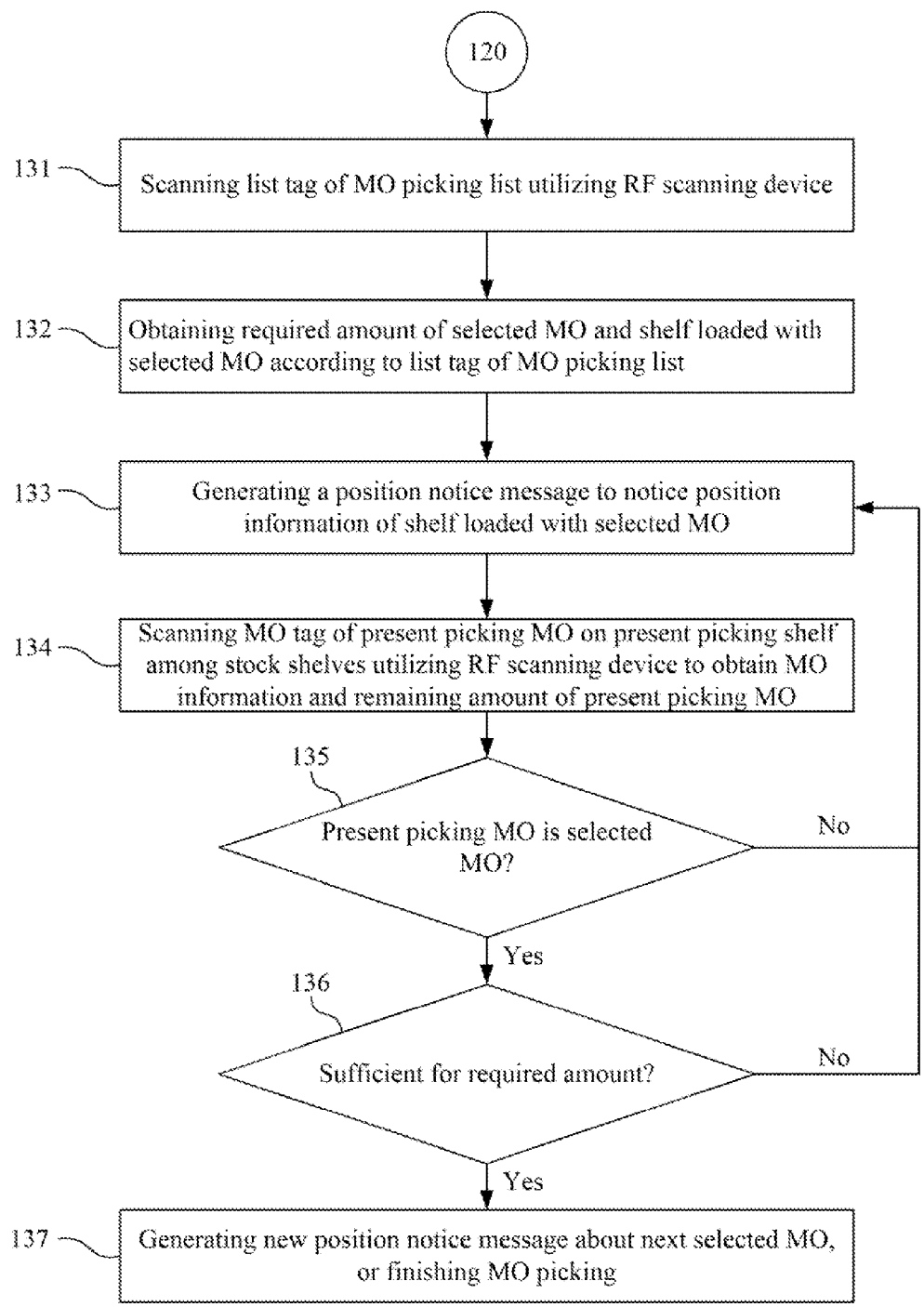
FIG. 3 is a flow diagram of an embodiment of step 130.

Referring to FIG. 3, an embodiment of step 130 will be described. Step 110 may start at operation 131 to scan the list tag of the MO picking list utilizing the RF scanning device. In other words, during picking MOs, a MO picking list can be provided to users, such that users can utilize the RF scanning device to scan the list tag of the MO picking list for performing operation 131.

Step 130 continues from operation 131 to operation 132 to obtain a required amount of the selected MO and a shelf loaded with the selected MO according to the scanned list tag of the MO picking list.

At operation 133, a position notice message to notice position information of the shelf loaded with the selected MO is generated. Hence, users can go to the shelf loaded with the selected MO according to the received position notice message.

At operation 134, the MO tag of the present picking MO on the present picking shelf among the stock shelves is scanned utilizing the RF scanning device to obtain MO information and a remaining amount of the present picking MO. In other words, in one scenario of this invention, when a user arrives a present picking shelf, he/she can utilize the RF scanning device to scan the MO tag of the present picking MO on the present picking shelf for performing operation 134.

Subsequently, step 130 continues to operation 135 to determine if the present picking MO is the selected MO according to the MO information of the selected MO and that of the present picking MO. When it is determined that the present picking MO is not the selected MO, step 130 may continues from operation 135 back to operation 133 to generate a position notice message to notice position information of the shelf loaded with the selected MO. Therefore, MOs may not be picked from a wrong shelf.

When it is determined that the present picking MO is the selected MO, step 130 may continues from operation 135 to operation 136 to determine if the remaining amount of the present picking MO is sufficient for the required amount of the selected MO. When it is determined that the remaining amount of the present picking MO is not sufficient for the required amount of the selected MO, step 130 may continue from operation 136 back to operation 133 to generate another position notice message to notice position information of another shelf loaded with the selected MO.

When it is determined that the remaining amount of the present picking MO is sufficient for the required amount of the selected MO, step 130 may continue from operation 136 to operation 137 to generate a new position notice message about next selected MO in the MO picking list, or to finish MO picking. Therefore, if the amount of picked MOs is sufficient can be determined automatically, which can avoid that users calculate wrong amount of picked MOs. Accordingly, extra users for check the amount of the picked MOs can be saved. In addition, users can learn to pick MOs by RF tag scanning easily.

Figure 4:
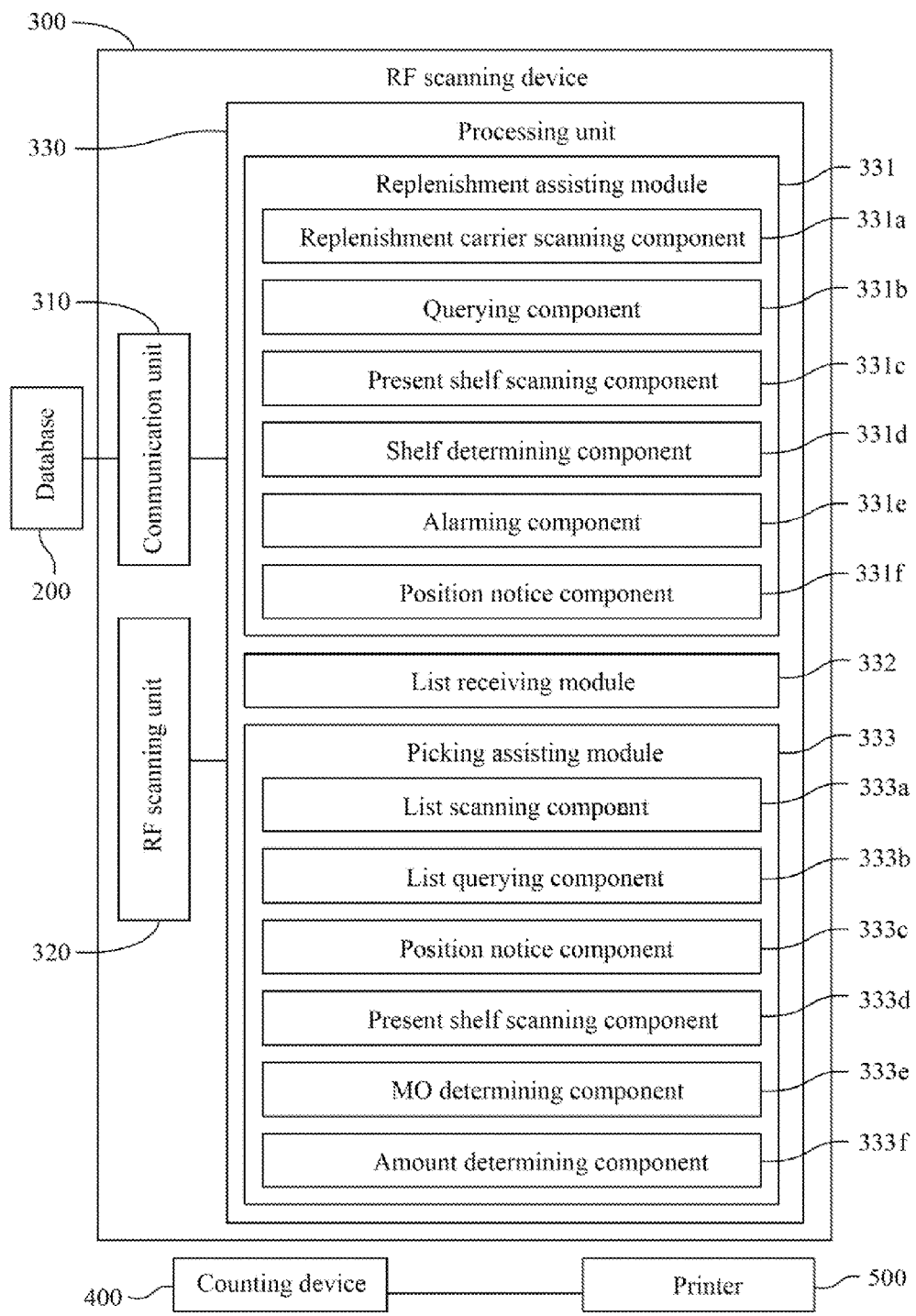
FIG. 4 illustrates a block diagram of an intellectual material object management system according to an embodiment of this invention

Referring to FIG. 4, a block diagram will be described that illustrates an intellectual material object management system according to an embodiment of this invention. The intellectual material object management system assists MO management by RF tag scanning. The intellectual material object management system includes a database 200, an RF scanning device 300, a counting device 400 and a printer 500. The RF scanning device 300 includes a communication unit 310, an RF scanning unit 320 and a processing unit 330. The communication unit 310 builds a connection with the database 200. The communication unit 310 may utilize IEEE 802.11 series, Wi-Fi®, ZigBee®, second-generation wireless telephone technology (2G), third-generation wireless telephone technology (3G), Worldwide Interoperability for Microwave Access (WiMAX®), Beyond 3G (B3G), Long Term Evolution (LTE®) or any other wireless data transmission technology to connect to a network for building a connection with the database 200. The processing unit 330 is electrically connected to the communication unit 310 and the RF scanning unit 320.

The processing unit 330 includes a replenishment assisting module 331, a list receiving module 332 and a picking assisting module 333. The replenishment assisting module 331 utilizes the RF scanning unit 320 to scan a carrier tag of a replenishment carrier and a shelf tag of at least one present supplying shelf. Subsequently, the replenishment assisting module 331 queries the database 200 according to the scanned carrier tag of the replenishment carrier and the scanned shelf tag of the present supplying shelf to assist for putting the replenishment carrier on a target shelf for the replenishment carrier. Wherein, the present supplying shelf is one of stock shelves of a warehouse.

The list receiving module 332 receives an MO picking list for obtaining information of at least one selected MO. The picking assisting module 333 utilizes the RF scanning unit 320 to scan an MO tag of a present picking MO on a present picking shelf among the stock shelves and a list tag of the MO picking list. Subsequently, the picking assisting module 332 queries the database 200 according to the scanned MO tag of the present picking MO and the scanned list tag of the MO picking list to assist for obtaining the selected MO from the stock shelves of the warehouse.

The counting device 400 counts a remaining amount of remaining MOs. The printer 500 builds a connection with the counting device 400. The printer 500 prints an amount tag for the remaining MOs according to the remaining amount of the remaining MOs. Hence, users can stick the printed amount tag on a remaining MO carrier for loading the remaining MOs. Therefore, it can be avoided that the remaining amount is hard to being identified due to careless or wrong handwriting. Furthermore, users can learn to supply or pick MOs easily utilizing the RF scanning device 300.

In one embodiment of this invention, the replenishment assisting module 331 may include a replenishment carrier scanning component 331a, a querying component 331b, a present shelf scanning component 331c and a shelf determining component 331d. The replenishment carrier scanning component 331a utilizes the RF scanning unit 320 to scan the carrier tag of the replenishment carrier to obtain an MO ID number of replenishment MOs loaded in the replenishment carrier and an amount of the replenishment MOs. Wherein, the target shelf is one of the stock shelves of the warehouse. In other words, in one scenario of this invention, during MO supplying, users can utilize the RF scanning device 300 to scan the carrier tag of the replenishment carrier, such that the replenishment carrier scanning component 331a can perform its function.

The querying component 331b queries the database 200 according to the MO ID number of the replenishment MOs to obtain shelf information of the target shelf. In addition, the replenishment assisting module 331 may further include a position notice component 331f to generate a position notice message to notice position information of the target shelf. Therefore, users can find the position of the target shelf easily.

The present shelf scanning component 331c utilizes the RF scanning unit 320 to scan the shelf tag of the present supplying shelf among the stock shelves to obtain shelf information of the present supplying shelf. In other words, in one scenario of this invention, when a user arrives a present supplying shelf, he/she can utilize the RF scanning device 300 to scan the shelf tag of the present supplying shelf, such that the present shelf scanning component 331c can perform its function.

The shelf determining component 331d determines if the present supplying shelf is the target shelf according to the shelf information of the present supplying shelf and that of the target shelf. When the shelf determining component 331d determines that the present supplying shelf is the target shelf, the processing unit 330 generates a match signal, updates and stores a loaded MO amount of the present supplying shelf stored in the database 200 according to the amount of the replenishment MOs. Hence, when the match signal is received, a user can put the replenishment carrier onto the present supplying shelf. Therefore, the replenishment carrier can be put onto the correct shelf, and the database 200 can store and update the amount of the MO loaded on the present supplying shelf correctly in time.

In addition, the replenishment assisting module 331 may further include an alarming component 331e. When the shelf determining component 331d determines that the present supplying shelf is not the target shelf, the alarming component 331e generates an alarm signal. In some embodiments, the alarming component 331e may utilize a display unit to display the alarm signal or utilize a speaker to generate an alarm sound as the alarm signal. Hence, when the alarm signal is received, a user may not put the replenishment carrier onto the wrong shelf.

In one embodiment of this invention, the picking assisting module 333 may include a list scanning component 333a, a list querying component 333b, a position notice component 333c, a present shelf scanning component 333d, an MO determining component 333e and an amount determining component 333f.

The list scanning component 333a utilizes the RF scanning unit 320 to scan the list tag of the MO picking list. In other words, during picking MOs, a MO picking list can be provided to users, such that users can utilize the RF scanning device 300 to scan the list tag of the MO picking list, such that the list scanning component 333a can perform its function.

The list querying component 333b queries the database 200 according to the scanned list tag of the MO picking list to obtain a required amount of the selected MO and a shelf loaded with the selected MO.

The position notice component 333c generates a position notice message to notice position information of the shelf loaded with the selected MO. Hence, users can go to the shelf loaded with the selected MO according to the received position notice message.

The present shelf scanning component 333d utilizes the RF scanning unit 320 to scan the MO tag of the present picking MO on the present picking shelf among the stock shelves to obtain MO information and a remaining amount of the present picking MO. In other words, in one scenario of this invention, when a user arrives a present picking shelf, he/she can utilize the RF scanning device 300 to scan the MO tag of the present picking MO on the present picking shelf, such that the present shelf scanning component 333d can perform its function.

The MO determining component 333e determines if the present picking MO is the selected MO according to the MO information of the selected MO and that of the present picking MO. When the MO determining component 333e determines that the present picking MO is not the selected MO, the position notice component 333c may generates a position notice message to notice position information of the shelf loaded with the selected MO. Therefore, MOs may not be picked from a wrong shelf.

When the MO determining component 333e determines that the present picking MO is the selected MO, the amount determining component 333f determines if the remaining amount of the present picking MO is sufficient for the required amount of the selected MO. When the amount determining component 333f determines that the remaining amount of the present picking MO is not sufficient for the required amount of the selected MO, the position notice component 333c generates another position notice message to notice position information of another shelf loaded with the selected MO.

When the amount determining component 333f determines that the remaining amount of the present picking MO is sufficient for the required amount of the selected MO, the position notice component 333c may generates another position notice message to notice position information of another shelf loaded with another selected MO or an MO picking finished message. Therefore, if the amount of picked MOs is sufficient can be determined automatically, which can avoid that users calculate wrong amount of picked MOs. Accordingly, extra users for check the amount of the picked MOs can be saved. In addition, users can learn to pick MOs by RF tag scanning easily.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An intellectual material object (MO) management method comprising the steps of:
   (a) scanning a carrier tag of a replenishment carrier and a shelf tag of at least one present supplying shelf utilizing a radio frequency (RF) scanning device to assist for putting the replenishment carrier on a target shelf for the replenishment carrier, wherein the present supplying shelf is one of a plurality of stock shelves of a warehouse;
   (b) receiving an MO picking list for obtaining information of at least one selected MO;
   (c) scanning an MO tag of a present picking MO on a present picking shelf, which is one of the stock shelves, and a list tag of the MO picking list utilizing the RF scanning device to assist for obtaining the selected MO from the stock shelves of the warehouse;
   (d) counting a remaining amount of remaining MOs utilizing a counting device; and
   (e) printing an amount tag for the remaining MOs according to the remaining amount of the remaining MOs for sticking on a remaining MO carrier for loading the remaining MOs.

2. The intellectual material object management method of claim 1, wherein step (a) comprises:
   scanning the carrier tag of the replenishment carrier utilizing the RF scanning device to obtain an MO identification (ID) number of replenishment MOs loaded in the replenishment carrier and an amount of the replenishment MOs, wherein the target shelf is one of the stock shelves;
   searching shelf information of the target shelf according to the MO ID number of the replenishment MOs;
   scanning the shelf tag of the present supplying shelf among the stock shelves utilizing the RF scanning device to obtain shelf information of the present supplying shelf;
   determining if the present supplying shelf is the target shelf according to the shelf information of the present supplying shelf and the shelf information of the target shelf; and
   when the present supplying shelf is determined to be the target shelf, generating a match signal, updating and storing a loaded MO amount of the present supplying shelf according to the amount of the replenishment MOs.

3. The intellectual material object management method of claim 2, wherein step (a) further comprises:
   when the present supplying shelf is determined not to be the target shelf, generating an alarm signal.

4. The intellectual material object management method of claim 2, wherein step (a) further comprises:
   generating a position notice message to notice position information of the target shelf.

5. The intellectual material object management method of claim 1, wherein step (c) comprises:
   scanning the list tag of the MO picking list utilizing the RF scanning device;
   obtaining a required amount of the selected MO and a shelf loaded with the selected MO according to the list tag of the MO picking list;
   generating a position notice message to notice position information of the shelf loaded with the selected MO;
   scanning the MO tag of the present picking MO on the present picking shelf among the stock shelves utilizing the RF scanning device to obtain MO information and a remaining amount of the present picking MO;
   determining if the present picking MO is the selected MO according to the MO information of the selected MO and that of the present picking MO;
   when the present picking MO is determined to be the selected MO, determining if the remaining amount of the present picking MO is sufficient for the required amount of the selected MO; and
   when the remaining amount of the present picking MO is determined to not be sufficient for the required amount of the selected MO, generating another position notice message to notice position information of another shelf loaded with the selected MO.

6. An intellectual material object (MO) management system, comprising:
   a database;
   a radio frequency (RF) scanning device comprising:

a communication unit which builds a connection with the database;

an RF scanning unit; and a processing unit electrically connected to the communication unit and the RF scanning unit, the processing unit comprising:

a replenishment assisting module which utilizes the RF scanning unit to scan a carrier tag of a replenishment carrier and a shelf tag of at least one present supplying shelf, and queries the database according to the scanned carrier tag of the replenishment carrier and the scanned shelf tag of the present supplying shelf to assist for putting the replenishment carrier on a target shelf for the replenishment carrier, wherein the present supplying shelf is one of a plurality of stock shelves of a warehouse;

a list receiving module which receives an MO picking list for obtaining information of at least one selected MO; and a picking assisting module which utilizes the RF scanning unit to scan an MO tag of a present picking MO on a present picking shelf, which is one of the stock shelves, and a list tag of the MO picking list, and queries the database according to the scanned MO tag of the present picking MO and the scanned list tag of the MO picking list to assist for obtaining the selected MO from the stock shelves of the warehouse;

a counting device which counts a remaining amount of remaining MOs; and a printer which prints an amount tag for the remaining MOs according to the remaining amount of the remaining MOs for sticking on a remaining MO carrier for loading the remaining MOs.

7. The intellectual material object management system of claim 6, wherein the replenishment assisting module comprises:

a replenishment carrier scanning component which utilizes the RF scanning unit to scan the carrier tag of the replenishment carrier to obtain an MO ID number of replenishment MOs loaded in the replenishment carrier and an amount of the replenishment MOs, wherein the target shelf is one of the stock shelves;

a querying component which queries the database according to the MO ID number of the replenishment MOs to obtain shelf information of the target shelf;

present shelf scanning component which utilizes the RF scanning unit to scan the shelf tag of the present supplying shelf among the stock shelves to obtain shelf information of the present supplying shelf; and a shelf determining component which determines if the present supplying shelf is the target shelf according to the shelf information of the present supplying shelf and that of the target shelf, wherein when the present supplying shelf is determined to be the target shelf, the processing unit generates a match signal, updates and stores a loaded MO amount of the present supplying shelf according to the amount of the replenishment MOs.

8. The intellectual material object management system of claim 7, wherein the replenishment assisting module further comprises:

an alarming component which generates an alarm signal when the present supplying shelf is determined not to be the target shelf.

9. The intellectual material object management system of claim 7, wherein the replenishment assisting module further comprises:

a position notice component which generates a position notice message to notice position information of the target shelf.

10. The intellectual material object management system of claim 6, wherein the picking assisting module comprises:

a list scanning component which utilizes the RF scanning unit to scan the list tag of the MO picking list;

a list querying component which queries the database according to the scanned list tag of the MO picking list to obtain a required amount of the selected MO and a shelf loaded with the selected MO;

a position notice component which generates a position notice message to notice position information of the shelf loaded with the selected MO;

a present shelf scanning component which utilizes the RF scanning unit to scan the MO tag of the present picking MO on the present picking shelf among the stock shelves to obtain MO information and a remaining amount of the present picking MO;

an MO determining component which determines if the present picking MO is the selected MO according to the MO information of the selected MO and that of the present picking MO; and an amount determining component which determines if the remaining amount of the present picking MO is sufficient for the required amount of the selected MO when the MO determining component determines that the present picking MO is the selected MO, wherein when the amount determining component determines that the remaining amount of the present picking MO is not sufficient for the required amount of the selected MO, the position notice component generates another position notice message to notice position information of another shelf loaded with the selected MO.

* * * * *